US009385617B2

(12) United States Patent
Hosotani et al.

(10) Patent No.: US 9,385,617 B2
(45) Date of Patent: Jul. 5, 2016

(54) OVERCURRENT PROTECTION CIRCUIT FOR A SWITCHING POWER SUPPLY APPARATUS

(71) Applicant: Murata Manufacturing Co., Ltd., Nagaokakyo-shi, Kyoto-fu (JP)

(72) Inventors: Tatsuya Hosotani, Nagaokakyo (JP); Naoki Yamaguchi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 103 days.

(21) Appl. No.: 14/480,998

(22) Filed: Sep. 9, 2014

(65) Prior Publication Data
US 2014/0376273 A1    Dec. 25, 2014

Related U.S. Application Data

(63) Continuation of application No. PCT/JP2013/057372, filed on Mar. 15, 2013.

(30) Foreign Application Priority Data

Mar. 30, 2012    (JP) ................................. 2012-078838

(51) Int. Cl.
*H02M 3/335* (2006.01)
*H02H 3/093* (2006.01)
(Continued)

(52) U.S. Cl.
CPC .......... *H02M 3/33546* (2013.01); *H02H 3/093* (2013.01); *H02M 1/32* (2013.01); *H02M 1/36* (2013.01); *H02M 3/33507* (2013.01); *H02M 2001/0058* (2013.01); *Y02B 70/1491* (2013.01)

(58) Field of Classification Search
CPC ............ H02M 1/32; H02M 1/36; H02H 3/08; H02H 3/087; H02H 3/093; H02H 3/0935
USPC ........ 363/21.01, 21.02, 21.04, 21.12; 361/18, 361/93.1, 93.9
See application file for complete search history.

(56) References Cited

U.S. PATENT DOCUMENTS

| 2007/0008748 A1* | 1/2007 | Tang ..................... H02M 3/156 363/21.12 |
| 2007/0057654 A1* | 3/2007 | Lee ......................... H02M 1/32 323/271 |

(Continued)

FOREIGN PATENT DOCUMENTS

| CN | 101487870 A | 7/2009 |
| CN | 102237808 A | 11/2011 |

(Continued)

OTHER PUBLICATIONS

NCP3231 (Datasheet, "High Current Synchronous Buck Converter," Semiconductor Components Industries, LLC, 2015).*

(Continued)

*Primary Examiner* — Gary L Laxton
*Assistant Examiner* — Jye-June Lee
(74) *Attorney, Agent, or Firm* — Keating & Bennett, LLP

(57) ABSTRACT

In a switching power supply apparatus, when it is detected at time t1 that a voltage Vis has exceeded a first threshold Vth1, a timer counting a period of time T1 is started, and the number times the input voltage Vis does not exceed Vth1 is started to be counted. When the timer expires before the count reaches a predetermined number, a first overcurrent protection operation is performed. When it is detected at time t2 that Vis has exceeded a second threshold Vth2, a second overcurrent protection operation is immediately performed. As a result, appropriate overcurrent protection is performed in accordance with the operating state of a load.

20 Claims, 17 Drawing Sheets

(51) Int. Cl.
*H02M 1/32* (2007.01)
*H02M 1/36* (2007.01)
*H02H 3/08* (2006.01)
*H02M 1/00* (2006.01)

(56) References Cited

U.S. PATENT DOCUMENTS

| | | |
|---|---|---|
| 2009/0184718 A1 | 7/2009 | Ivan et al. |
| 2011/0019322 A1* | 1/2011 | Akama .................. H02M 1/32 361/93.1 |
| 2011/0103101 A1 | 5/2011 | Hiasa |
| 2013/0271876 A1 | 10/2013 | Hosotani |

FOREIGN PATENT DOCUMENTS

| | | |
|---|---|---|
| JP | 03-022862 A | 1/1991 |
| JP | 06-233519 A | 8/1994 |
| JP | 2008-206271 A | 9/2008 |
| WO | 2011/129185 A1 | 10/2011 |

OTHER PUBLICATIONS

Official Communication issued in International Patent Application No. PCT/JP2013/057372, mailed on Jun. 18, 2013.

Official Communication issued in corresponding Chinese Patent Application No. 201380018111.9, mailed on Apr. 1, 2016.

* cited by examiner

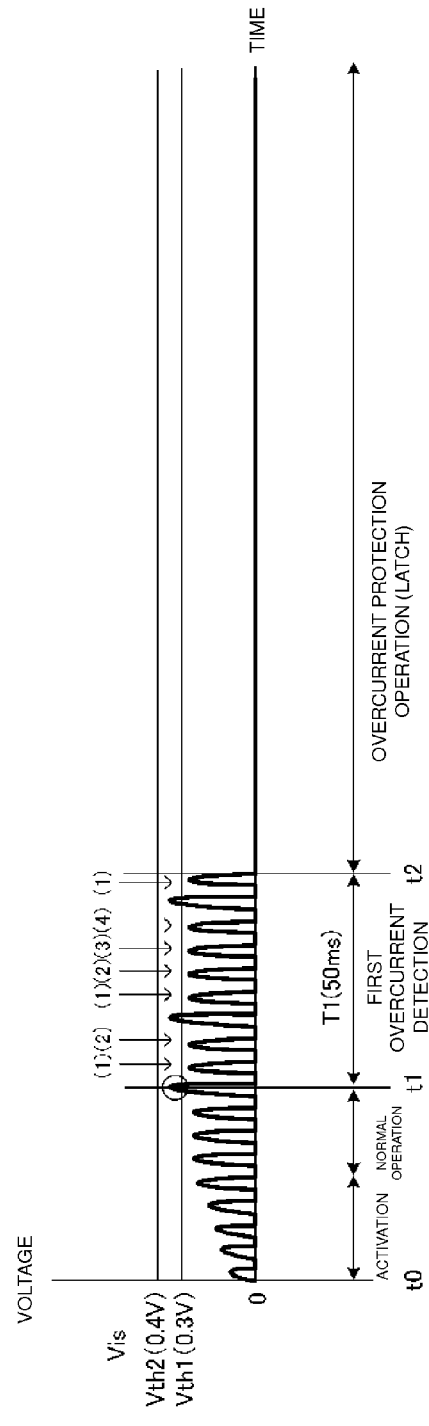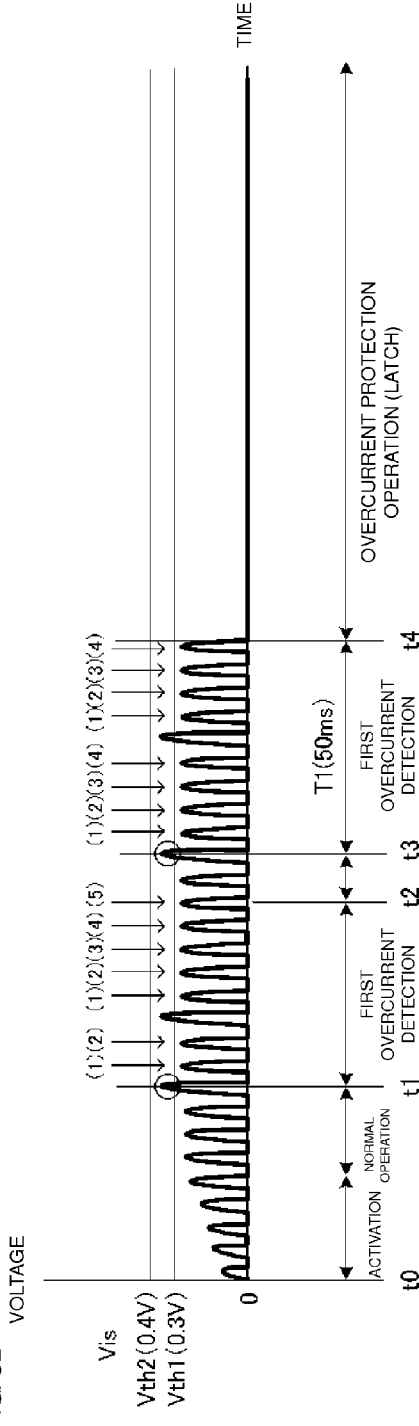

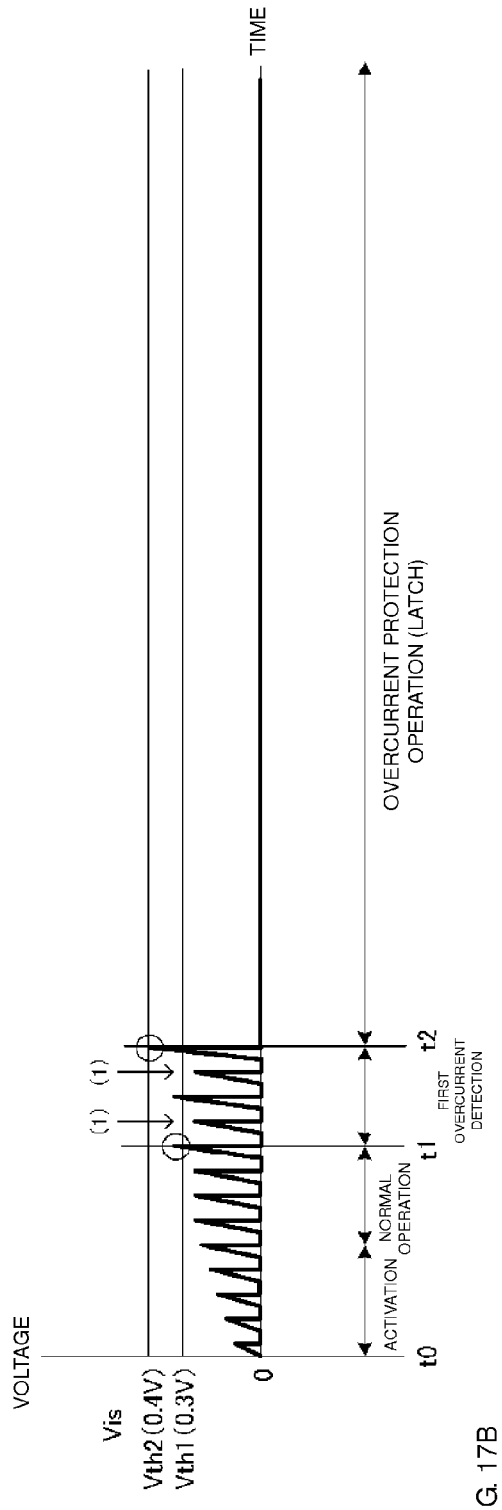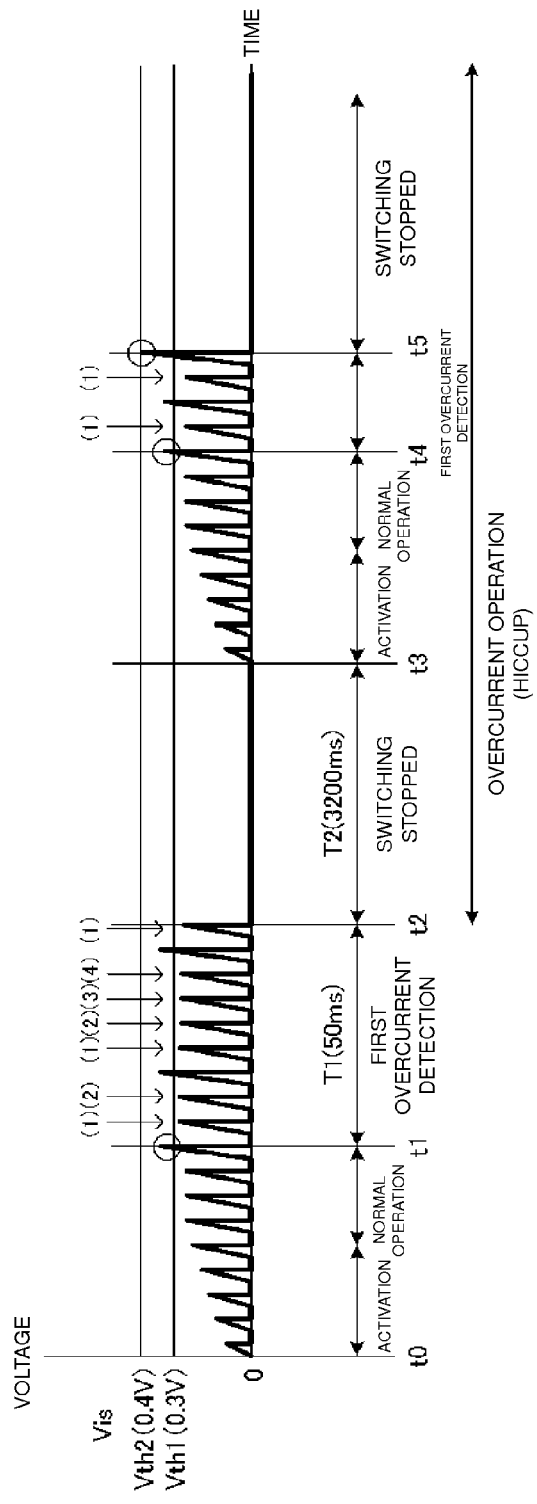

OVERCURRENT PROTECTION CIRCUIT FOR A SWITCHING POWER SUPPLY APPARATUS

BACKGROUND OF THE INVENTION

1. Field of the Invention

The present invention relates to a switching power supply apparatus, and specifically to a switching power supply apparatus provided with an overcurrent protection function.

2. Description of the Related Art

A switching power supply apparatus includes a power conversion circuit that converts an input voltage input from an input power supply into an output voltage supplied to a load, a switch device that switches the input voltage, a switching control circuit that controls the switch device, and the like. The switching control circuit is provided with an overcurrent protection function of protecting the switch device, a diode, an inductor, and the like against problems such as overheating or damage of components due to, for example, an overcurrent. For example, Japanese Unexamined Patent Application Publication No. 2008-206271 discloses a switching power apparatus configured to limit input/output power by turning off a switch device when it is detected that a current flowing through the switch device has reached a predetermined threshold, thereby performing an overcurrent protection operation.

In a switching power supply apparatus such as the one disclosed in Japanese Unexamined Patent Application Publication No. 2008-206271, when it is detected that a current (trapezoidal-wave current) flowing through a switch device has reached a predetermined threshold, the switch device is turned off at that point of time. As a result, the peak value of the current flowing through the switch device is limited, whereby overcurrent protection is realized. In other words, since switching is immediately stopped when the current flowing through the switch device has exceeded the threshold, the peak value of the current flowing through the switch device is limited to an overcurrent corresponding to the threshold.

However, there may be a case in which defects of devices such as a switch device, a diode, and an inductor are not caused by an overcurrent itself but caused by overheating due to the overcurrent. Hence, if control is performed in such a manner that the switching is stopped only on the basis of the determination result of comparison between a current flowing through a switch device and a threshold, as in Japanese Unexamined Patent Application Publication No. 2008-206271, the following problems may be encountered.

For example, an overcurrent protection operation that is performed in such a manner that a switching operation is immediately stopped when a load current, which continuously flows in a steady state, gradually increases to a certain threshold (overcurrent) is rational in terms of its objective. However, in the case where a switching power supply apparatus with a rating of 100 W for heat generation intermittently drives a 200 W load with a duty cycle of 50%, when a threshold is set at 110 W output, overcurrent protection is performed right after a 200 W load has been started to be driven and, hence, driving for a desired operation cannot be performed at all. When a 200 W load is driven with a duty cycle of 50%, the average power is 100 W and, hence, no heat problems are generated for the devices such as a switch device, a diode, and an inductor of the switching power supply apparatus, and no defects due to heat are generated. In other words, the apparatus can be designed in such a manner that no defects are generated. If the switching power supply apparatus is designed, from the beginning, in such a manner as to have a power rating of 200 W, the average power is more than that necessary for a load with an average of 100 W. In other words, this results in overdesign in terms of size and cost.

Further, when control is performed in such a manner that switching is immediately stopped only on the basis of the determination result of comparison between a current flowing through a switch device and a threshold, as in the switching power supply apparatus disclosed in Japanese Unexamined Patent Application Publication No. 2008-206271, in the case where the waveform of a current flowing through the switch device is a half-wave sine wave, the switch device is tuned off at the peak of the current. Hence, this may cause a problem in that the current waveform suddenly changes from a half-wave sine wave to a quarter-wave sine wave and the resonance condition is no longer satisfied, causing significant distortion of an operation waveform, resulting in an increase in the size of an output voltage ripple, generation of audible noise, and generation of defective operations in the switching power supply apparatus.

SUMMARY OF THE INVENTION

Preferred embodiments of the present invention provide a switching power supply apparatus that allows appropriate overcurrent protection in accordance with an operating state of a load.

According to a switching control circuit of a preferred embodiment of the present invention, a switching power supply apparatus includes a power conversion circuit configured to convert an input voltage input from an input power supply into an output voltage supplied to a load, a switch device configured to perform switching for the input voltage, a switching control circuit configured to control the switch device, and a current detection circuit configured to detect a current that flows through the switch device in each switching period. The apparatus includes a first overcurrent protection circuit configured to stop a switching operation without outputting an on signal to the switch device in a case where a current detection signal obtained by the current detection circuit has exceeded a first threshold, and after this, when it is determined by the switching control circuit that the number of consecutive switching operations, for which the first threshold is not exceeded, has not reached a predetermined number in a predetermined period.

With this configuration, the switch device is not immediately turned off at a point of time when a current flowing through the switch device has exceeded a threshold, but an overcurrent protection operation is performed when it is determined by the switching control circuit that the number of consecutive switching operations, for which the current detection signal obtained by the current detection circuit does not exceed the first threshold, has not reached a predetermined number in a predetermined period. Hence, without responding to a temporary or transient increase in power, appropriate overcurrent protection (an operation referred to as output power protection) is performed in accordance with the operating state of a load.

The switching power supply apparatus preferably is configured to, after the switching operation has been stopped by the first overcurrent protection circuit, maintain a state in which the switching operation has been stopped. A switching power supply apparatus having this configuration is appropriate for a load (electronic apparatus or the like) used in such a manner that the operation needs to be stopped once the load has been determined to be in an overcurrent state.

The switching power supply apparatus preferably includes a recovery circuit configured to start the switching a predetermined period after the switching operation has been stopped by the first overcurrent protection circuit. The switching power supply apparatus with this configuration is appropriate for a load (electronic apparatus or the like) used in such a manner that power supply is to be recovered when the switch device, diode, inductor, and the like have returned to a normal temperature after the load has once been determined to be in an overcurrent state.

The switching power supply apparatus preferably includes a soft-start control circuit configured to gradually increasing an on-time width of the switch device at the time of starting the switching operation. With this configuration, by starting switching operations using the soft-start function, an overcurrent protection operation is realized while reducing stress applied to the switch device and the like.

The switching power supply apparatus preferably includes a second overcurrent protection circuit configured to stop the switching operation by immediately making the switch device be in an off state when it has been detected that the current detection signal obtained by the current detection circuit has exceeded a second threshold that is larger than the first threshold. With this configuration, when the current flowing through the switch device reaches a predetermined value, the switching operation is immediately stopped, and an overcurrent flowing through the switch device is restricted, such that the switch device and the like are protected from an overcurrent.

The power conversion circuit may be a current resonant converter, for example. With this configuration, the waveform of a current flowing through the switch device becomes a half-wave sine wave and, hence, the present overcurrent system is effectively utilized. In other words, it becomes unlikely that the size of an output voltage ripple will be increased, audible sound will be generated, or the switching power supply apparatus will be destroyed in the worst case because of the current waveform suddenly changing from a half-wave sine wave to a quarter-wave sine wave and the operation waveform becoming considerably distorted, excluding a case in which the switch device and the like are protected by limiting an overcurrent flowing through the switch device.

According to various preferred embodiments of the present invention, the following advantageous effects are obtained.

The switch device is not immediately turned off at a point of time when a current flowing through the switch device has exceeded a threshold, but an overcurrent protection operation is performed when it is determined that the number of consecutive switching operations, for which the current detection signal obtained by the current detection circuit does not exceed the first threshold, has not reached a predetermined number in a predetermined period. Hence, without responding to a temporary or transient increase in power, appropriate overcurrent protection is performed in accordance with the operating state of a load.

An overcurrent protection operation is realized not only for the case in which the current waveform of a current flowing through the switch device is a waveform in which a current increases with time, such as a triangular wave or a trapezoidal wave, but also for any current waveform.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 3A and 3B are waveform diagrams of the voltage Vis of the IS terminal for explaining an overcurrent protection operation, wherein FIG. 3A and FIG. 3B are both diagrams illustrating a first overcurrent protection operation in a latch mode.

FIGS. 5A and 5B are waveform diagrams of the voltage Vis of the IS terminal for explaining the overcurrent protection operation, wherein FIG. 5A and FIG. 5B are both diagrams illustrating a second overcurrent protection operation.

FIGS. 15A and 15B are waveform diagrams of the voltage Vis of the IS terminal for explaining an overcurrent protection operation in the switching power supply apparatus according to the third preferred embodiment, wherein FIG. 15A and FIG. 15B are both diagrams illustrating a first overcurrent protection operation in the latch mode.

FIGS. 17A and 17B are waveform diagrams of the voltage Vis of the IS terminal for explaining the overcurrent protection operation in the switching power supply apparatus according to the third preferred embodiment, wherein FIG.

17A and FIG. 17B are both diagrams illustrating a second overcurrent protection operation.

DETAILED DESCRIPTION OF THE PREFERRED EMBODIMENTS

Hereinafter, preferred embodiments of the present invention will be described with reference to the drawings in sequence.

First Preferred Embodiment

Figure 1:
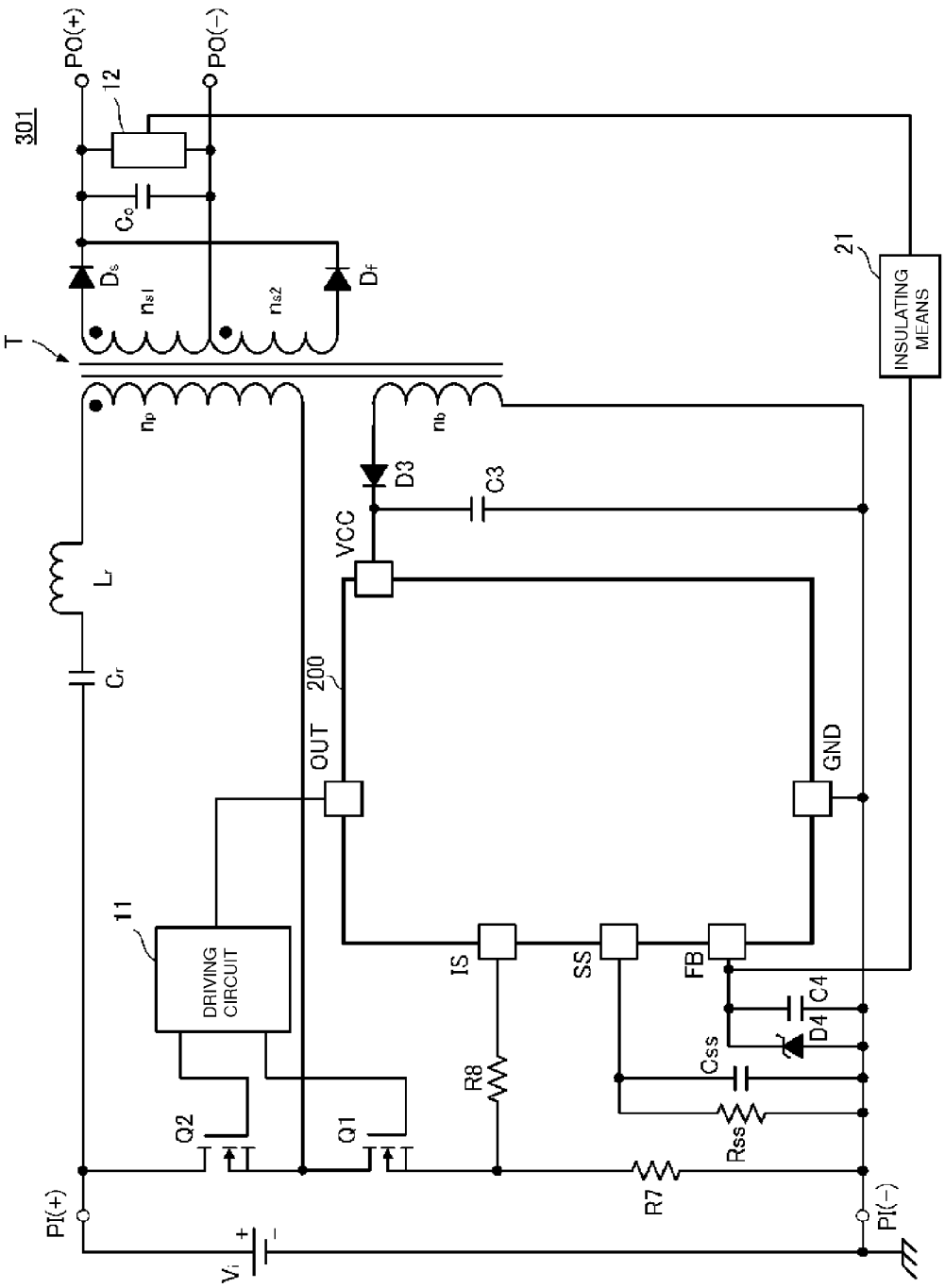
FIG. 1 is a circuit diagram of a switching power supply apparatus 301 according to a first preferred embodiment of the present invention.

FIG. 1 is a circuit diagram of a switching power supply apparatus 301 according to a first preferred embodiment of the present invention. The switching power supply apparatus 301 includes a switching control IC 200.

A voltage of a DC input power supply Vi is input between input terminals PI(+)-PI(−) of the switching power supply apparatus 301. A predetermined DC voltage is output to a load connected between output terminals PO(+)-PO(−) of the switching power supply apparatus 301.

A first series circuit including a resonant capacitor Cr, a resonant inductor Lr, a primary winding np of a transformer T, a first switch device Q1, and a current detection resistor R7 connected in series with one another is provided between the input terminals PI(+)-PI(−). The first switch device Q1 preferably is defined by an n-type MOSFET, whose drain terminal is connected to the primary winding np and whose source terminal is connected to the current detection resistor R7.

A second switch device Q2 preferably is defined by an n-type MOSFET, whose drain is connected to the input terminal PI(+) and whose source terminal is connected to the drain terminal of the first switch device Q1.

A center-tap full-wave rectifying and smoothing circuit including diodes Ds and Df and a capacitor Co is provided at secondary windings ns1 and ns2 of the transformer T. An AC voltage output from the secondary windings ns1 and ns2 is subjected to full-wave rectification and smoothing performed by the rectifying and smoothing circuit and output from the output terminals PO(+)-PO(−).

A rectifying and smoothing circuit including a diode D3 and a capacitor C3 is connected to a driving winding nb of the transformer T. A DC voltage obtained by this rectifying and smoothing circuit is applied between a GND terminal and a VCC terminal of the switching control IC 200 as a power supply voltage.

In the switching power supply apparatus 301, a circuit excluding the switching control IC 200 is a power conversion circuit and defines a current resonant converter, in this example.

The switching control IC 200 outputs a rectangular-wave signal from its OUT terminal to a driving circuit 11. The driving circuit 11 drives the first switch device Q1 and the second switch device Q2 in a complementary manner. Here, a dead time period in which Q1 and Q2 are off is provided to prevent Q1 and Q2 from being switched on at the same time.

A resistor R8 is connected to a current detection terminal IS of the switching control IC 200 so that a voltage dropped across the current detection resistor R7 is input.

A feedback circuit 12 is provided between the switching control IC 200 and the output terminals PO(+)-PO(−). The feedback circuit 12 is a circuit configured to generate a feedback signal on the basis of a comparison of a divided voltage of the voltage between the output terminals PO(+)-PO(−) with a reference voltage, and input a feedback voltage to a feedback terminal FB of the switching control IC 200 through an insulating member 21, which preferably includes a photocoupler or a pulse transformer, for example.

A resistor Rss and a capacitor Css are connected between a soft-start terminal SS and the ground.

A capacitor C4 and a Zener diode D4 are connected between the feedback terminal FB and the ground.

The feedback circuit 12 is configured to operate such that the higher the output voltage output to the output terminals PO(+)-PO(−) with respect to a set voltage, the lower the voltage of the feedback terminal FB.

The switching control IC 200 outputs a rectangular-wave signal from an output terminal OUT and drives the first switch device Q1 and the second switch device Q2 with a predetermined switching frequency through the driving circuit 11. As a result, the switching power supply apparatus 301 operates as a current resonant converter.

During a normal operation, i.e., not during an overcurrent operation, the switching control IC 200 detects an output voltage on the basis of an input signal at the feedback terminal FB, and controls the frequency of a square-wave signal output to the output terminal OUT such that the output voltage is maintained at a constant voltage. As a result, the output voltage of the switching power supply apparatus 301 is stabilized.

The soft-start terminal SS of the switching control IC 200 is a terminal configured to cause a soft-start operation to be performed. With soft-start control, the width of the on-time of output pulses that drive the switch devices Q1 and Q2 is gradually increased when the converter is activated. The length of a soft-start period is set by the time constant of an external circuit connected to the soft-start terminal SS. Specifically, a constant-current circuit is internally connected to the soft-start terminal SS, and the time constant to charge the capacitor Css is determined by the magnitude of this current and the capacitance of the externally connected capacitor Css. As described above, the switching control IC 200 includes a soft-start control unit.

The switching control IC 200 is configured or programmed to include the following functions.

(1) A first overcurrent protection function of limiting the output power by stopping the switching operation when a change in the input voltage at the IS terminal satisfies a first condition described later.

(2) A second overcurrent protection function of limiting the output power by stopping the switching operation when the change in the input voltage at the IS terminal satisfies a second condition described later.

Figure 2:
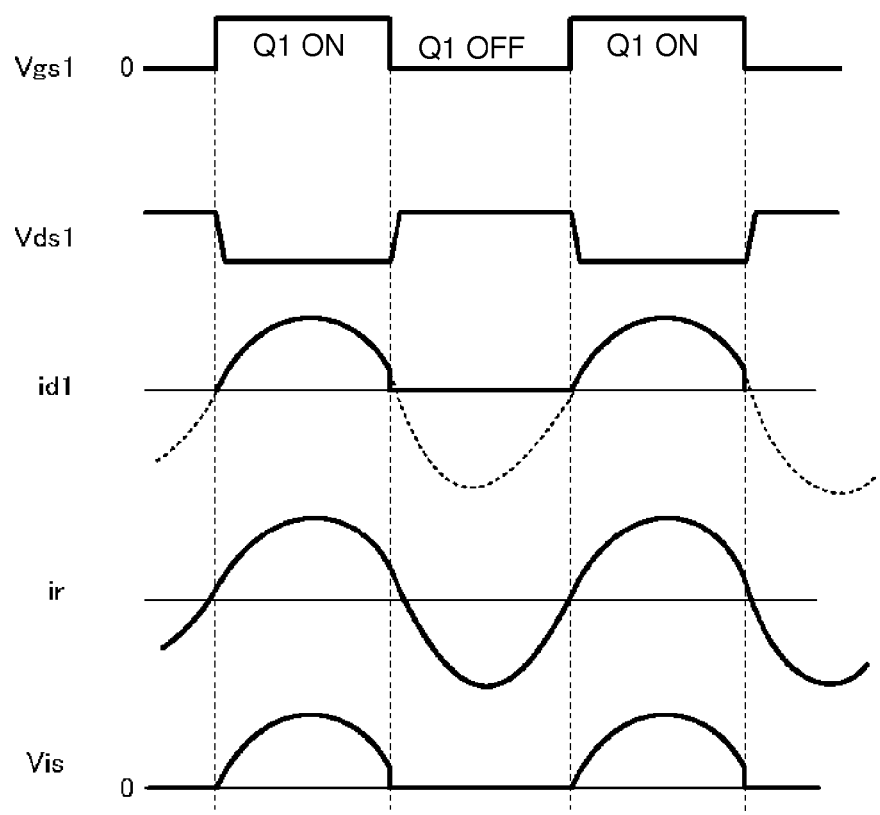
FIG. 2 is a waveform diagram illustrating a source-gate voltage Vgs1 of a switch device Q1, a drain-source voltage Vds1 of the switch device Q1, a drain current id1 of the switch device Q1, an input voltage Vis of an IS terminal, and a resonant current flowing through a capacitor Cr and an inductor Lr, illustrated in FIG. 1.

FIG. 2 is a waveform diagram illustrating a source-gate voltage Vgs1 of the first switch device Q1, a drain-source voltage Vds1 of the first switch device Q1, a drain current id1 of the switch device Q1, an input voltage Vis of the IS terminal, and a resonant current flowing through the capacitor Cr and the inductor Lr, illustrated in FIG. 1.

When the switch device Q1 is turned on, the drain current id1 flows. The drain current id1 has a waveform shaped like a half-wave sine wave due to the resonance of the capacitor Cr and the inductor Lr.

FIGS. 3A and 3B, FIG. 4, and FIGS. 5A and 5B are waveform diagrams of the voltage Vis ("current detection signal" according to preferred embodiments of the present invention) of the IS terminal for describing an overcurrent protection operation. The operation illustrated in FIG. 3A is as follows. After activation at time t0, the drain current of the switch device Q1 gradually increases (soft start) until normal operation is reached. When it is detected at time t1 that Vis has exceeded a first threshold Vth1 (preferably about 0.3 v in this example), a timer configured to count a period of time T1 (preferably about 50 ms in this example) is started. Then, the number of times Vis does not exceed Vth1 is started to be counted. When the timer expires (e.g., about 50 ms have passed) before this count reaches, for example, "5", the overcurrent protection operation is performed. In the example of FIG. 3A, the switching is maintained stopped (latched).

The operation illustrated in FIG. 3B is as follows. After activation at time t0, the drain current of the switch device Q1 gradually increases (soft start) until normal operation is reached. When it is detected at time t1 that Vis has exceeded a first threshold Vth1 (preferably about 0.3 V in this example), a timer configured to count a period of time T1 (50 ms in this example) is started. Then, the number of times Vis does not exceed Vth1 is started to be counted. When the count reaches, for example, "5" at time t2, the timer is stopped. Then, when it is detected that Vis has exceeded the first threshold Vth1 (preferably about 0.3 V) at time t3, the timer is restarted, and the number of times Vis does not exceed Vth1 is started to be counted. When the timer expires at time t4, (preferably about 50 ms have passed from t3) before this count reaches, for example, "5", the overcurrent protection operation is performed. In the example of FIG. 3B, the switching is maintained stopped (latched).

Figure 4:
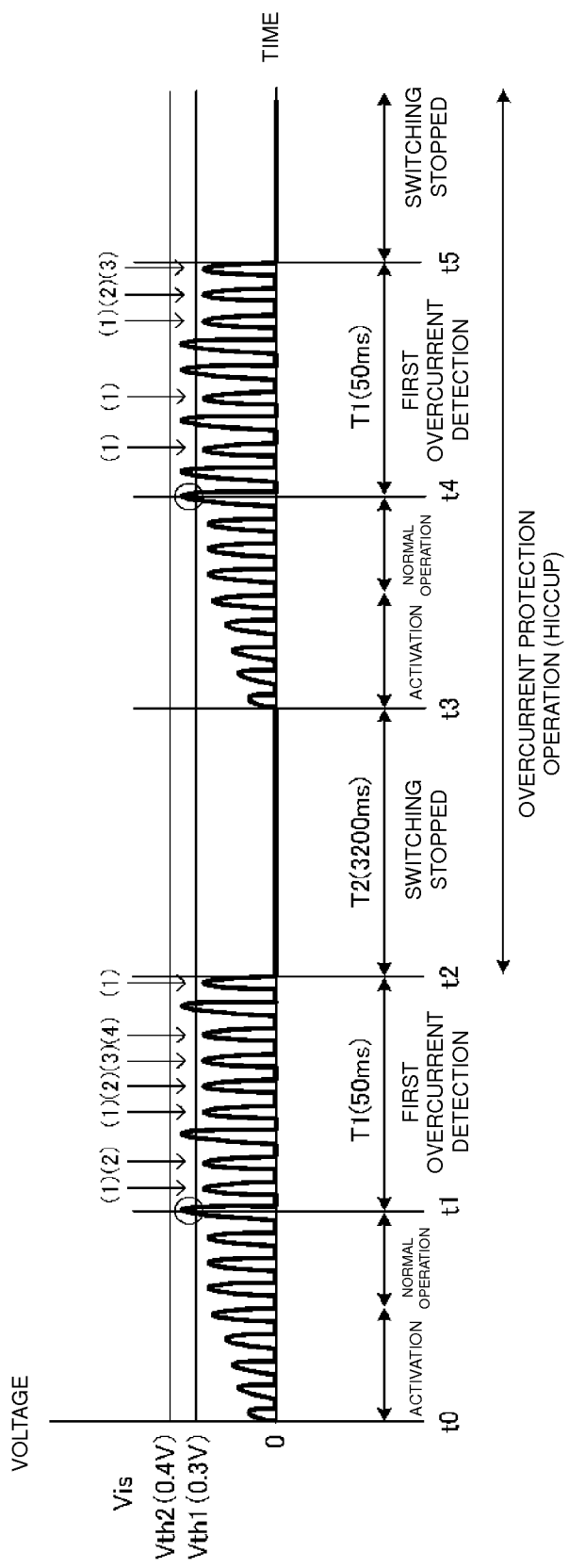
FIG. 4 is a waveform diagram of the voltage Vis of the IS terminal for explaining an overcurrent protection operation, and is a diagram illustrating an overcurrent protection operation in a self-recovery (hiccup) mode.

FIG. 4 is a diagram illustrating an overcurrent protection operation in a self-recovery (hiccup) mode. Unlike FIG. 3A, switching is stopped at time t2 and a timer counting a period of time T2 (preferably about 3200 ms in this example) is started. After that, when the timer expires at time t3, reactivation is performed. In other words, self recovery is performed. When the load continues to be in approximately the same overcurrent state, the overcurrent protection operation and self-recovering operation are repeated.

Figure 5A:
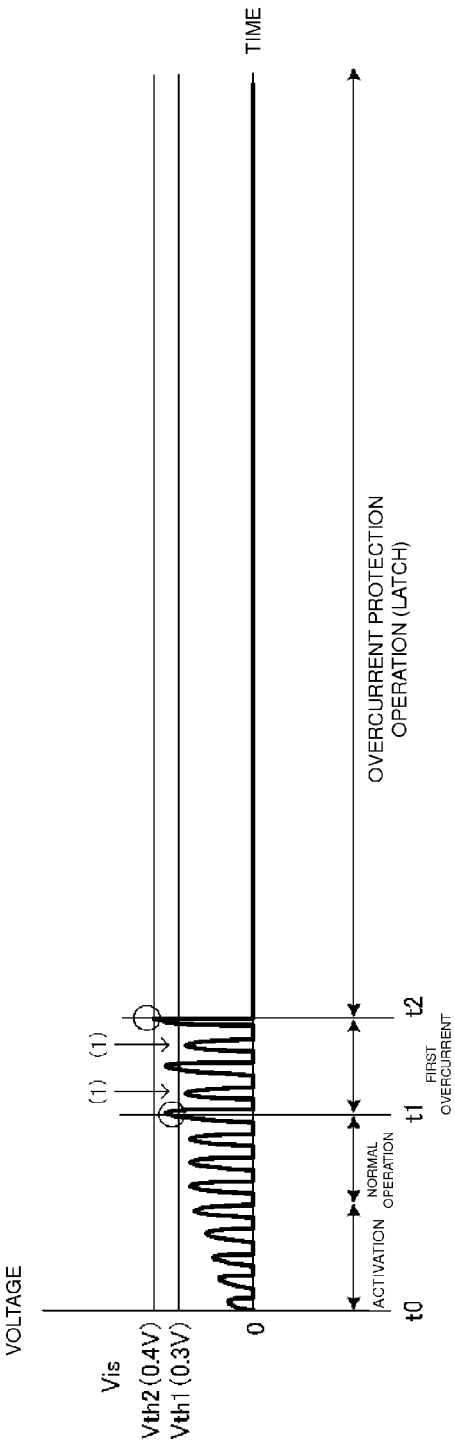
Figure 5B:
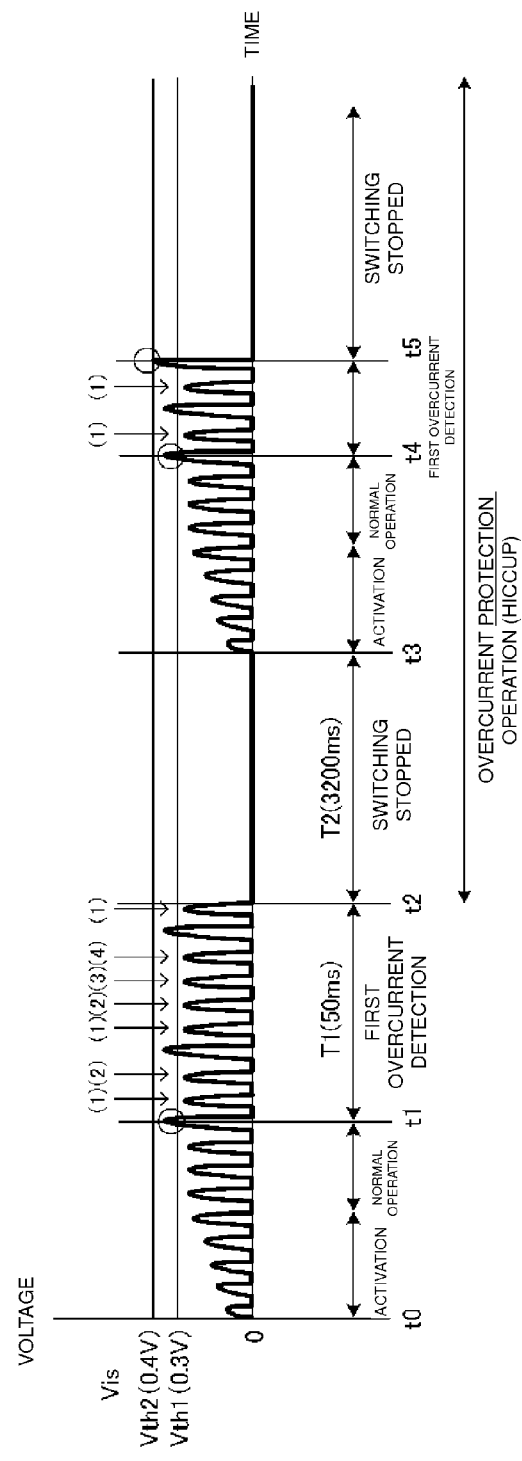

FIGS. 5A and 5B are diagrams illustrating an overcurrent protection operation performed at the time when Vis exceeds a second threshold Vth2. The operation illustrated in FIG. 5A is as follows. After activation at time t0, the drain current of the switch device Q1 gradually increases (soft start) until normal operation is reached. When it is detected at time t1 that Vis has exceeded a first threshold Vth1 (preferably about 0.3 V), a timer configured to count a period of time T1 (preferably about 50 ms) is started. Then, the number of times Vis does not exceed Vth1 is started to be counted. After that, when it is detected at time t2 that Vis has exceeded the second threshold Vth2, an overcurrent protection operation is immediately performed. In the example of FIG. 5A, switching is maintained stopped (latched). FIG. 5B is a diagram illustrating an overcurrent protection operation in a self-recovery (hiccup) mode. When it is detected at time t5 that Vis has exceeded the second threshold Vth2, the switching is stopped and a timer that counts a period of time T2 (preferably about 3200 ms) is started. After that, when the timer expires, reactivation is performed. In other words, self recovery is performed. The overcurrent protection operation and self-recovery operation are repeated when the load continues to be in approximately the same overcurrent state.

Note that a configuration may be used in which by setting the second threshold Vth2 at a higher value, the switching is started to be kept stopped and latched at a point of time when Vis has exceeded the second threshold Vth2 also in the self-recovery (hiccup) mode.

Figure 6:
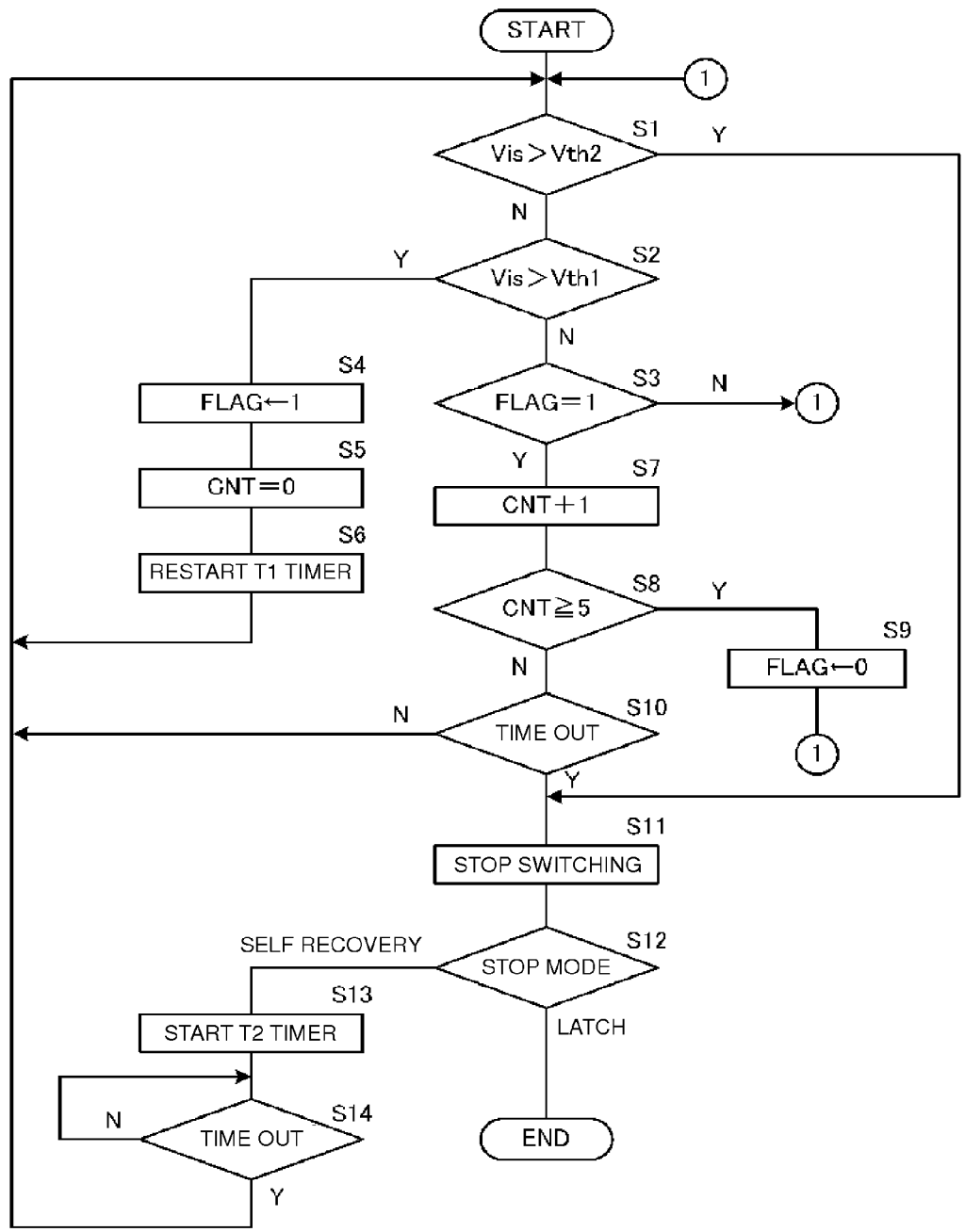
FIG. 6 is a flowchart illustrating the content of processing for the overcurrent protection operation.

FIG. 6 is a flowchart illustrating the content of processing for the overcurrent protection operation described above. In a state where the IS terminal voltage Vis does not exceed the first threshold Vth1, processing for steps S1→S2→S3→S1→ . . . is repeated. When it is detected that Vis has exceeded the first threshold Vth1, a flag FLAG is set, a counter CNT is reset, and a T1 timer (50 ms) is started (restarted) (S2→S4→S5→S6). After the flag FLAG has been set, the counter CNT is counted up (S3→S7→S8→S10→S1), when Vis≤Vth1. When the counter CNT reaches 5, the flag FLAG is reset and the flow returns to the initial state (S8→S9→S1). When the T1 timer expires before the counter CNT reaches 5, switching is stopped (S8→S10→S11). When the stop mode is "latch", a state in which switching is stopped is maintained (S12→END). In the case of "self recovery", the T2 timer (preferably about 3200 ms) is started, and the flow waits until the timer expires (S12→S13→S14). When the timer expires, the flow returns to the initial state (S14→S1).

As described above, the switch device Q1 is maintained in an off state and switching is stopped when it is detected that switching operations in which the current detection signal Vis does not exceed the first threshold Vth1 have not consecutively occurred five times in the period of time T1. This configuration defines the "first overcurrent protection circuit" according to preferred embodiments of the present invention.

When it is detected that Vis has exceeded the second threshold Vth2, switching is immediately stopped (S1→S11).

In this manner, when it is detected that the current detection signal Vis has exceeded the second threshold Vth2, the switch device Q1 is maintained in an off state, and the switching operation is stopped. This configuration is the "second overcurrent protection circuit" according to preferred embodiments of the present invention.

Figure 7:
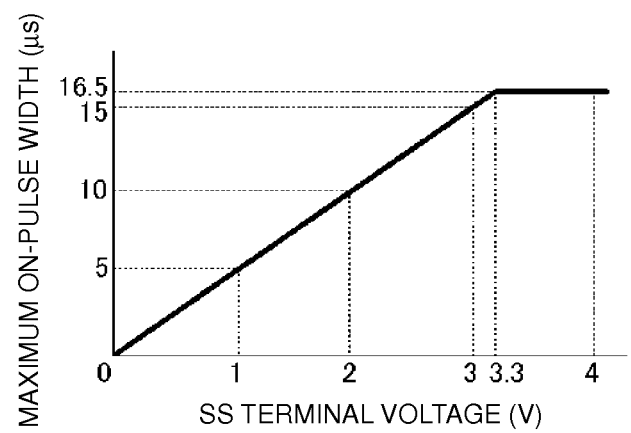
FIG. 7 is a diagram illustrating the relationship between the voltage of a soft-start terminal SS and the maximum on-pulse width.

FIG. 7 is a diagram illustrating the relationship between the voltage of the soft-start terminal SS and the maximum on-pulse width. The maximum on-pulse width is determined within the range of about 0-16.5 µs, for example, in proportion to the voltage of the soft-start terminal SS, when the voltage of the soft-start terminal SS is within the range of about 0-3.3 V, for example. When the voltage of the soft-start terminal SS is about 3.3 V or higher, the maximum on-pulse width is maintained at about 16.5 µs, for example.

Figure 8:
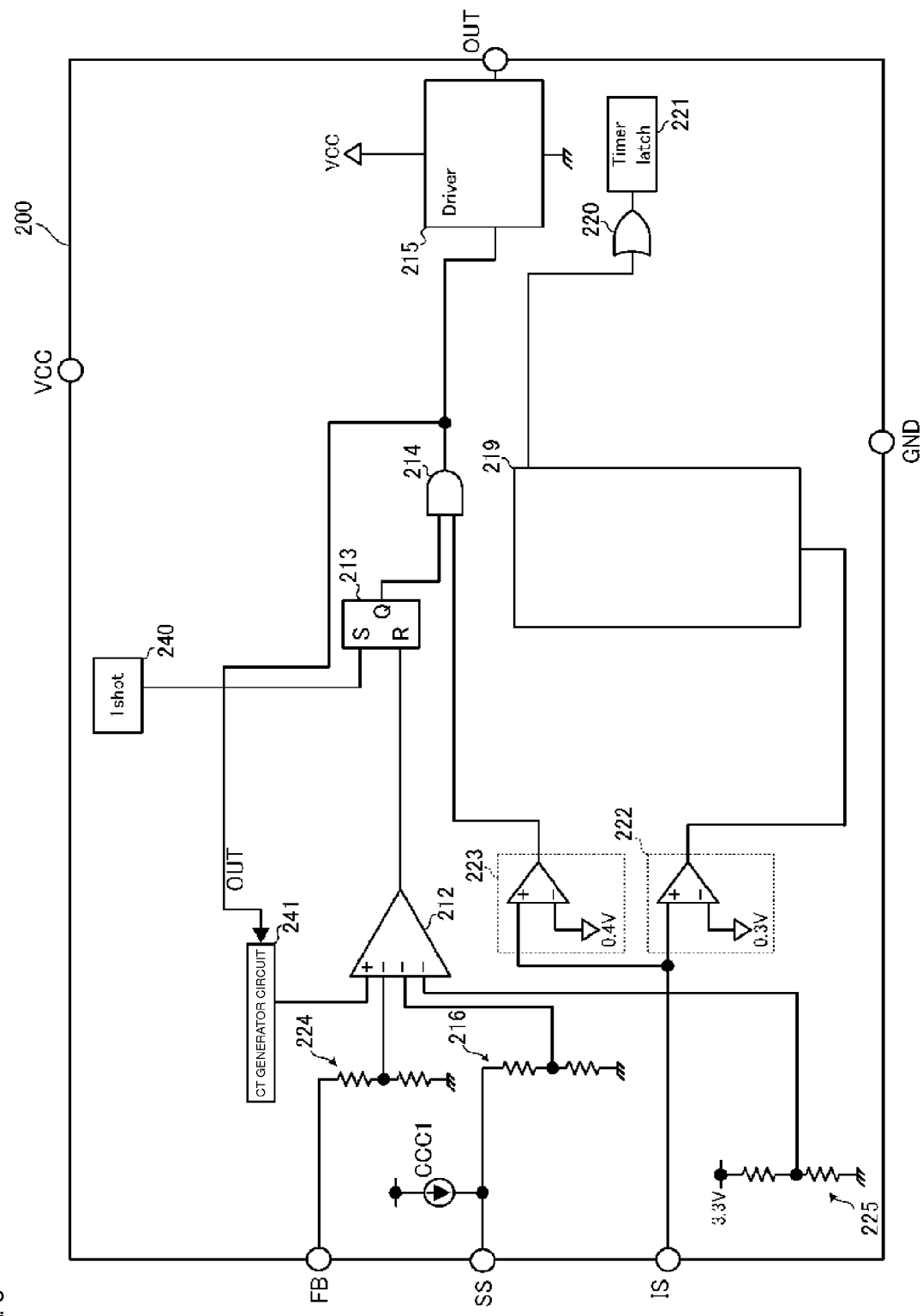
FIG. 8 is a block diagram illustrating the internal configuration of a switching control IC 200.

FIG. 8 is a block diagram illustrating the internal configuration of the switching control IC 200. Referring to FIG. 8, when a one-shot pulse generation circuit 240 resets a flip-flop 213, the Q output signal of the flip-flop 213 is output as a high-level gate control signal to the OUT terminal via an AND gate 214 and a driver 215.

A CT generator circuit 241 is configured to output a voltage with a ramp waveform after the output level of an AND gate 214 has become high. A comparator 212 is configured to reset the flip-flop 213 at a point of time when the output voltage of the CT generator circuit 241 has exceeded the lowest voltage among the voltages input to the three (−) terminals, thereby making the voltage level of the OUT terminal return to a low level.

By repeating the above operations, the output voltage of the OUT terminal is made to vary like a square wave.

A constant-current circuit CCC1 is connected to the soft-start terminal SS. By connecting the capacitor Css to the soft-start terminal SS as illustrated in FIG. 1, the voltage of the soft-start terminal SS becomes the same as the voltage across the capacitor Css being charged. In accordance with an increase in the voltage of the soft-start terminal SS, a timing at which the output of the comparator 212 is reversed is delayed, such that the on time of the switch device is gradually increased. This realizes a soft-start operation.

By externally connecting the resistor Rss to the soft-start terminal SS, as illustrated in FIG. 1, in a state where the capacitor Css has been fully charged, the voltage of the soft-start terminal SS is determined in accordance with the current of the constant-current circuit CCC1 and the resistance of the resistor Rss.

During a soft-start period, the output voltage of a resistor voltage divider circuit 216 is the lowest among the voltages input to the three (−) terminals of the comparator 212 and, hence, the on-time width of the switch device gradually increases in accordance with an increase in the voltage of the soft-start terminal SS, such that a soft-start operation is performed.

When the soft-start operation is finished, the output voltage of a resistor voltage divider circuit 224 is the lowest among the voltages input to the three (−) terminals of the comparator 212 and, hence, the on-time of the switch device is determined in accordance with a voltage applied to the feedback terminal FB. When the voltage of the feedback terminal FB becomes higher than a voltage (a voltage lower than or equal to about 3.3 V, which is the voltage of a resistor voltage divider circuit 225) applied to the soft-start terminal SS determined by the externally connected resistor Rss, the voltage applied to the soft-start terminal SS becomes the lowest, among the voltages input to the three (−) terminals of the comparator 212. Hence, the on time is controlled so as not to further increase, such that the maximum on time or the maximum time ratio is set.

A first overcurrent detection circuit 222 is configured to make its output level high when the voltage of the IS terminal has exceeded the first threshold Vth1 (preferably about 0.3 V, for example). In response to this output of the first overcurrent detection circuit 222, an overcurrent protection control circuit 219 performs the control described above. In other words, the overcurrent protection control circuit 219 is configured or programmed to cause a timer latch 221 to be latched via an OR gate 220 when a condition for the first overcurrent protection is satisfied. As a result, the switching is stopped.

Note that in the case of an overcurrent as large as a current corresponding to a voltage exceeding the second threshold Vth2 (preferably about 0.4 V, for example), the output level of a second overcurrent detection circuit 223 becomes high and the switch device Q1 is turned off at a high speed, thus limiting the peak value of a flowing current and preventing a failure such as a damage to a circuit device due to overstress caused by the peak current of the circuit device. In other words, the second overcurrent protection function is realized.

Second Preferred Embodiment

Figure 9:
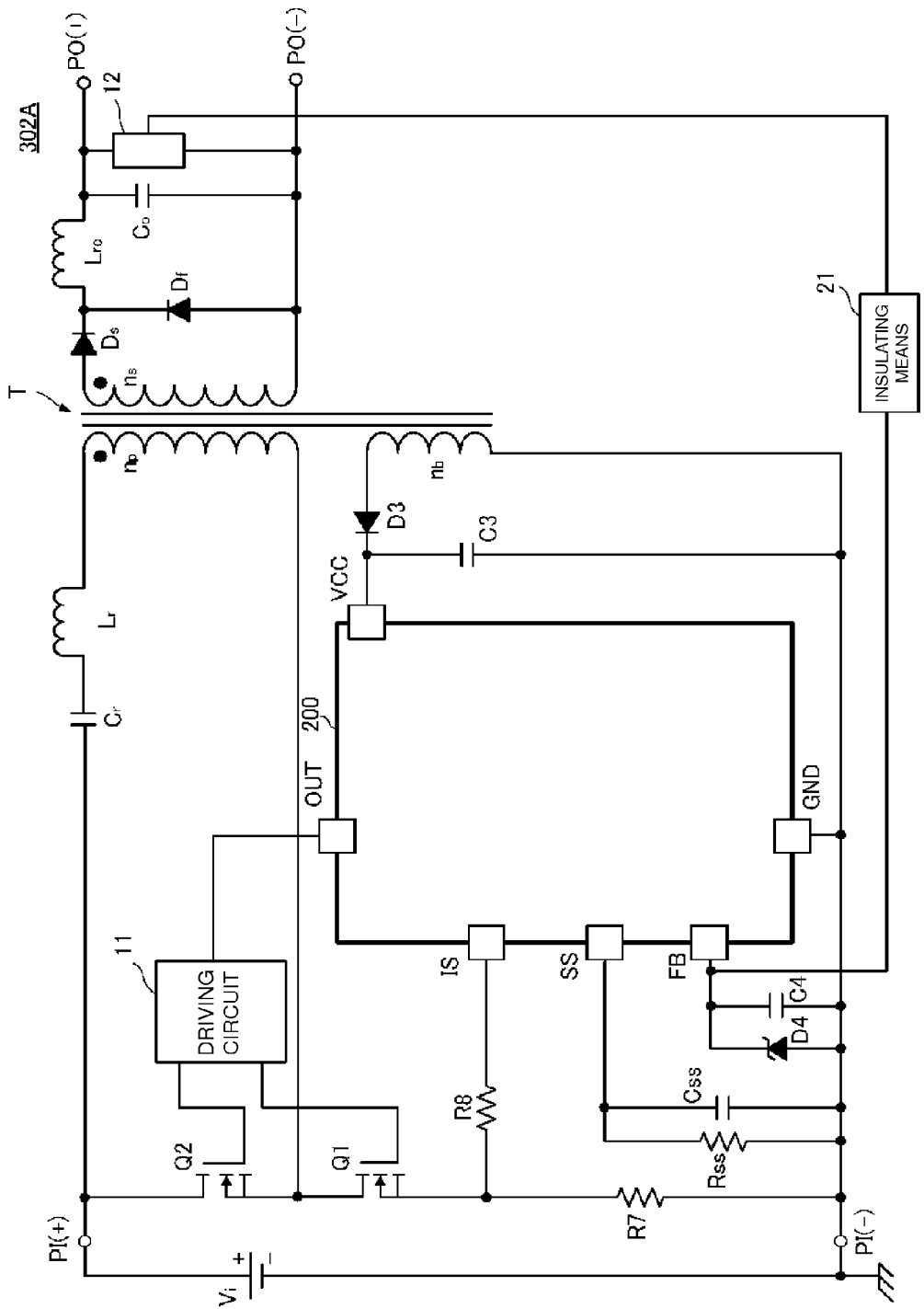
FIG. 9 is a circuit diagram of a switching power supply apparatus 302A according to a second preferred embodiment of the present invention.
Figure 10:
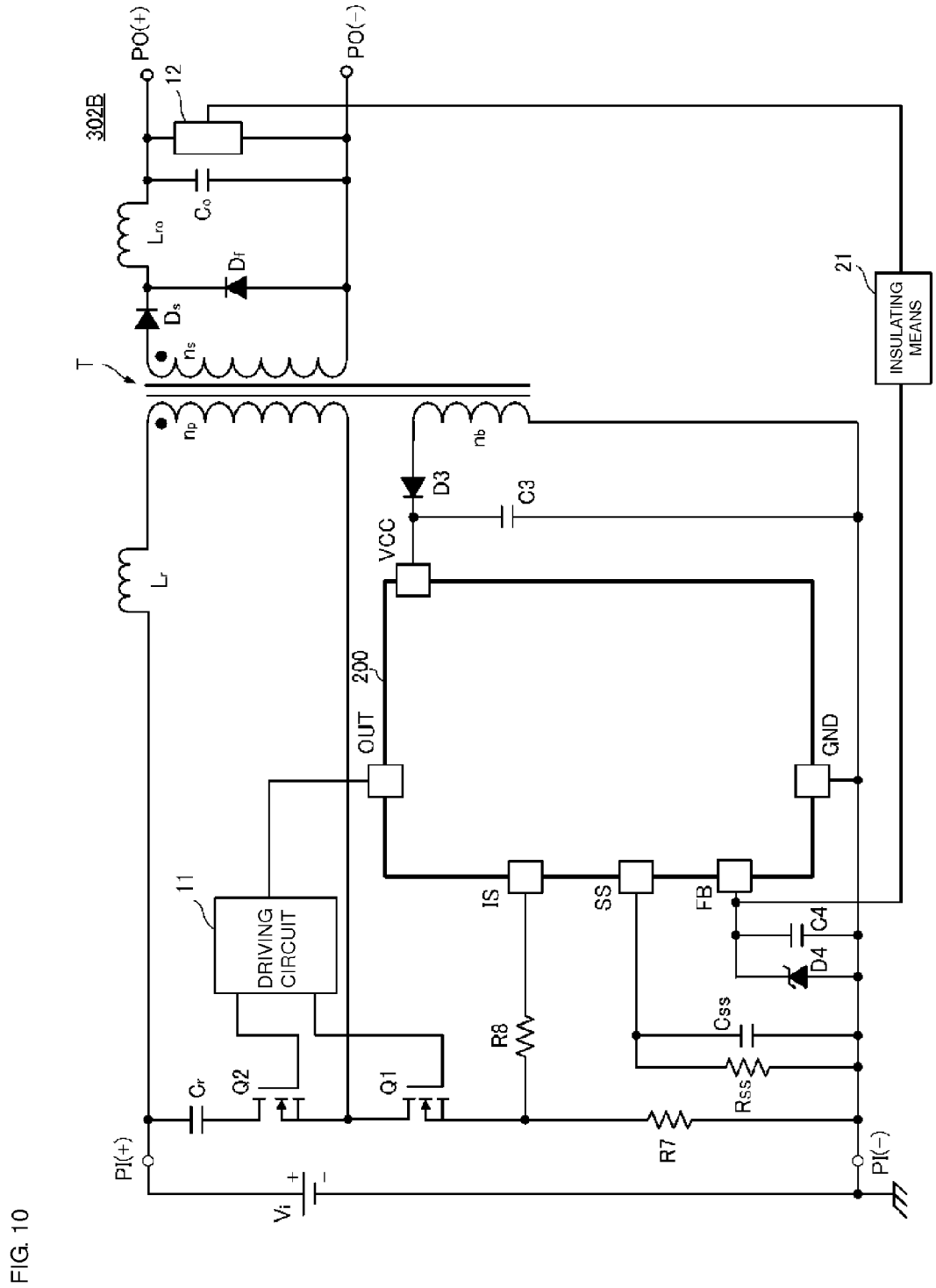
FIG. 10 is a circuit diagram of a switching power supply apparatus 302B according to the second preferred embodiment of the present invention.
Figure 11:
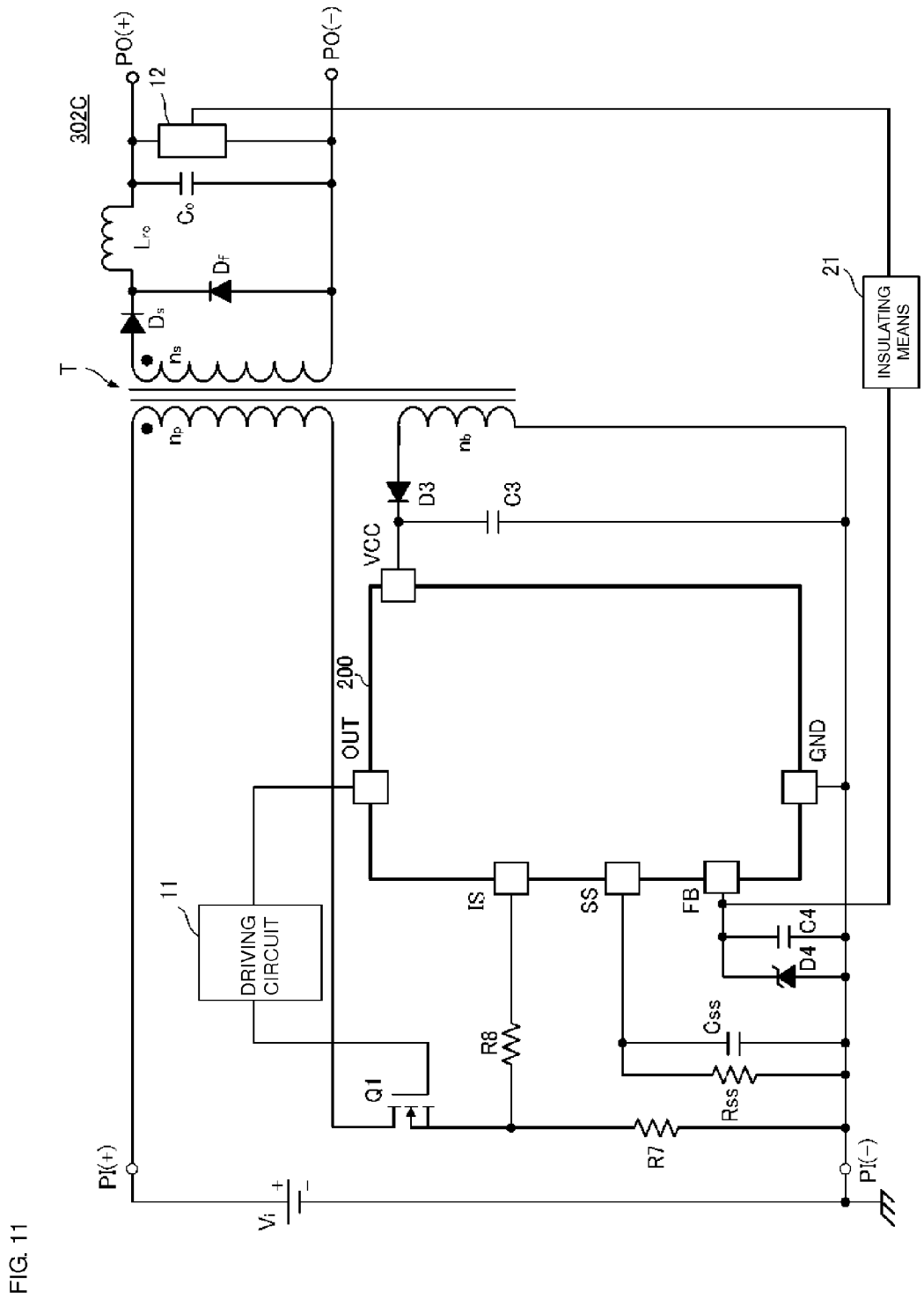
FIG. 11 is a circuit diagram of a switching power supply apparatus 302C according to the second preferred embodiment of the present invention.

FIG. 9, FIG. 10, and FIG. 11 are circuit diagrams of switching power supply apparatuses 302A, 302B, and 302C according to a second preferred embodiment of the present invention. In each of the switching power supply apparatuses 302A, 302B, and 302C, the secondary side of the transformer T preferably is of the forward type. In this manner, a forward system preferably is used by providing a rectifying and smoothing circuit including diodes Ds and Df, an inductor Lro, and a capacitor Co on the secondary side of the transformer.

The switching power supply apparatuses 302A and 302B differ in terms of a position at which the primary side capacitor Cr is connected. The primary side capacitor Cr need only be inserted in series into a closed loop defined during the on time of the high-side switch device Q2 and, hence, the capacitor Cr may be connected in series with the drain of the switch device Q2, as illustrated in FIG. 10.

The switching power supply apparatus 302C is a simple forward converter without the inductor Lr, the capacitor Cr, and the switch device Q2. In this manner, a preferred embodiment of the present invention is similarly applied to a simple forward converter, and similar operations and effects are obtained.

Third Preferred Embodiment

Figure 12:
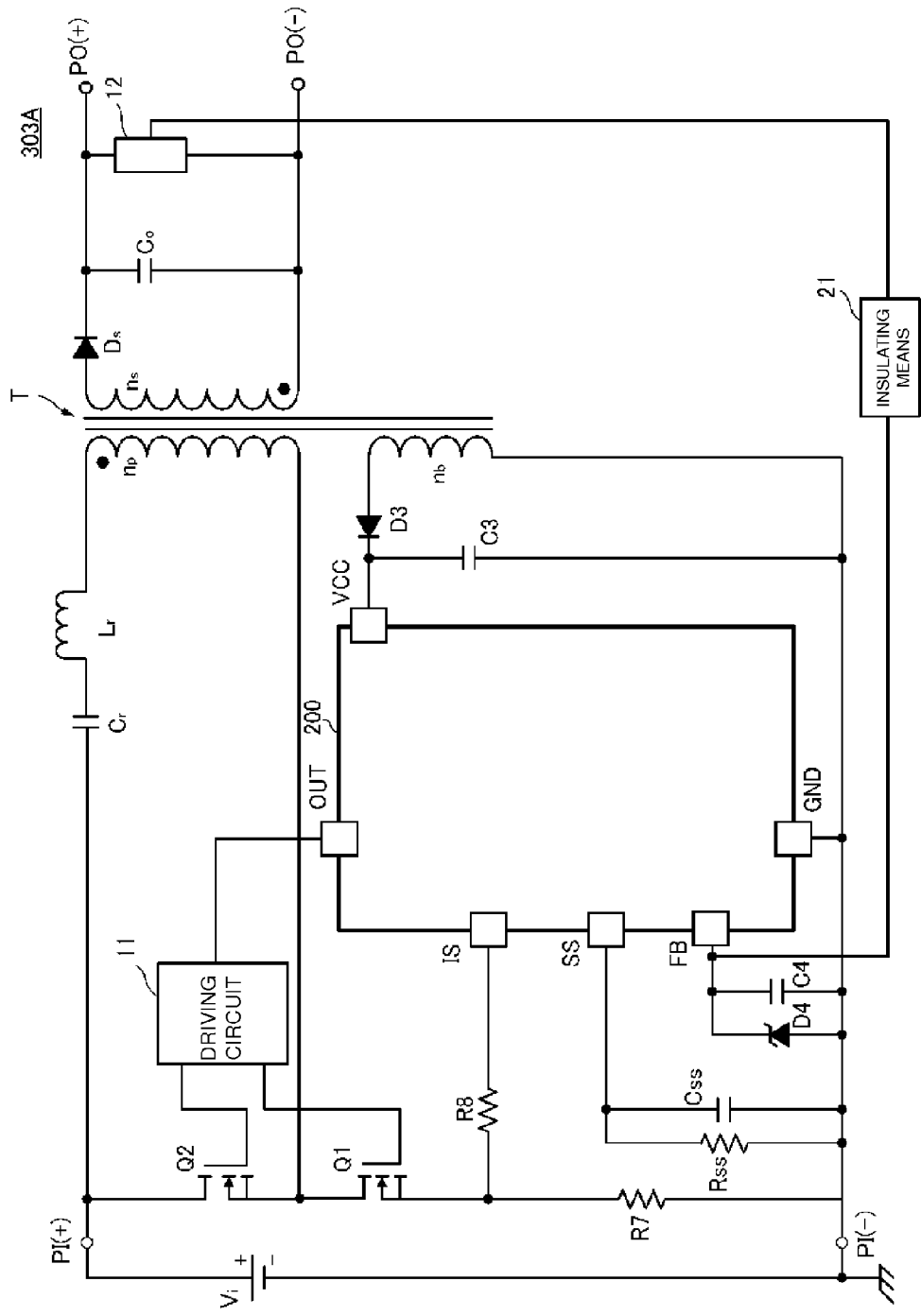
FIG. 12 is a circuit diagram of a switching power supply apparatus 303A according to a third preferred embodiment of the present invention.
Figure 13:
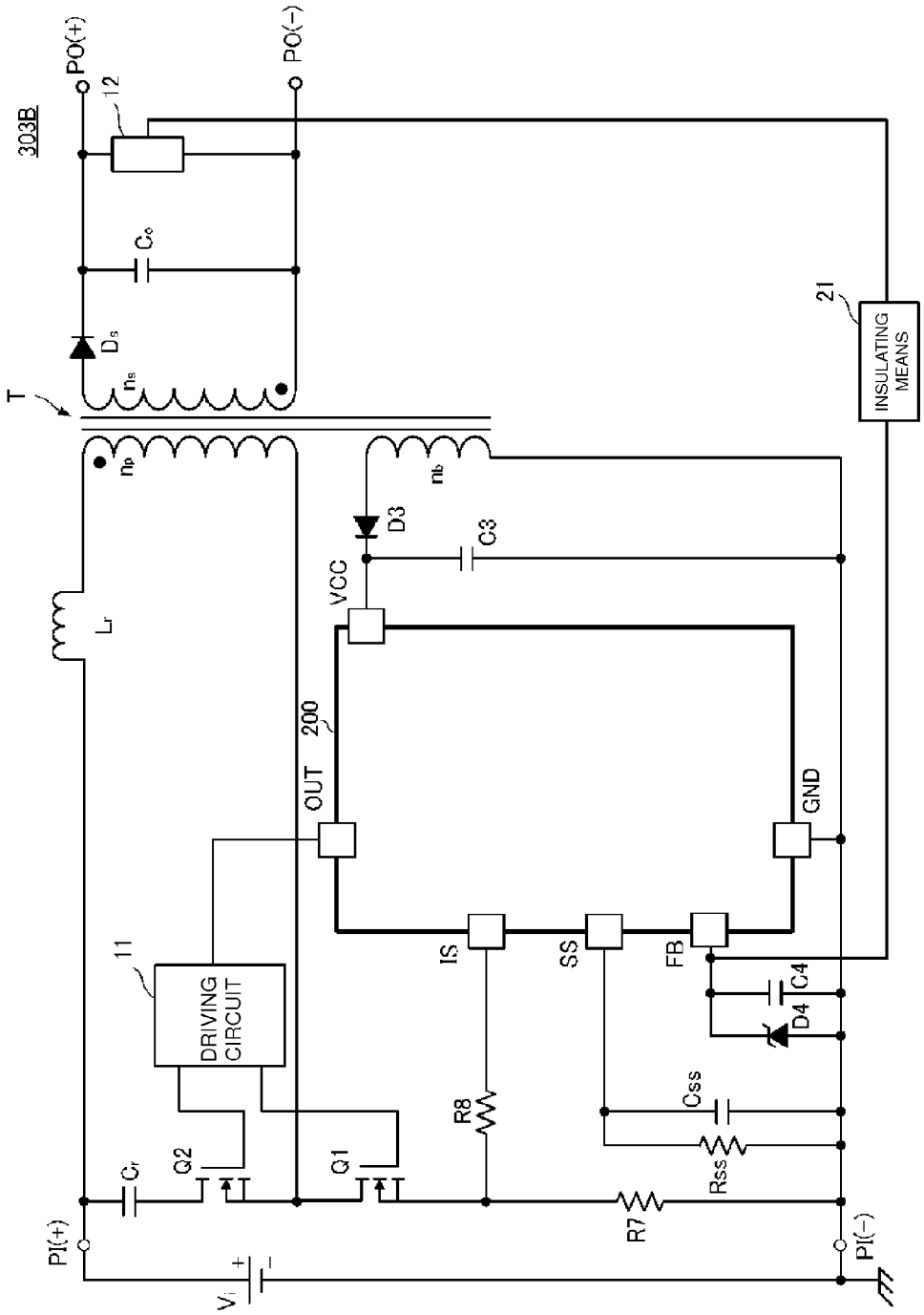
FIG. 13 is a circuit diagram of a switching power supply apparatus 303B according to the third preferred embodiment of the present invention.
Figure 14:
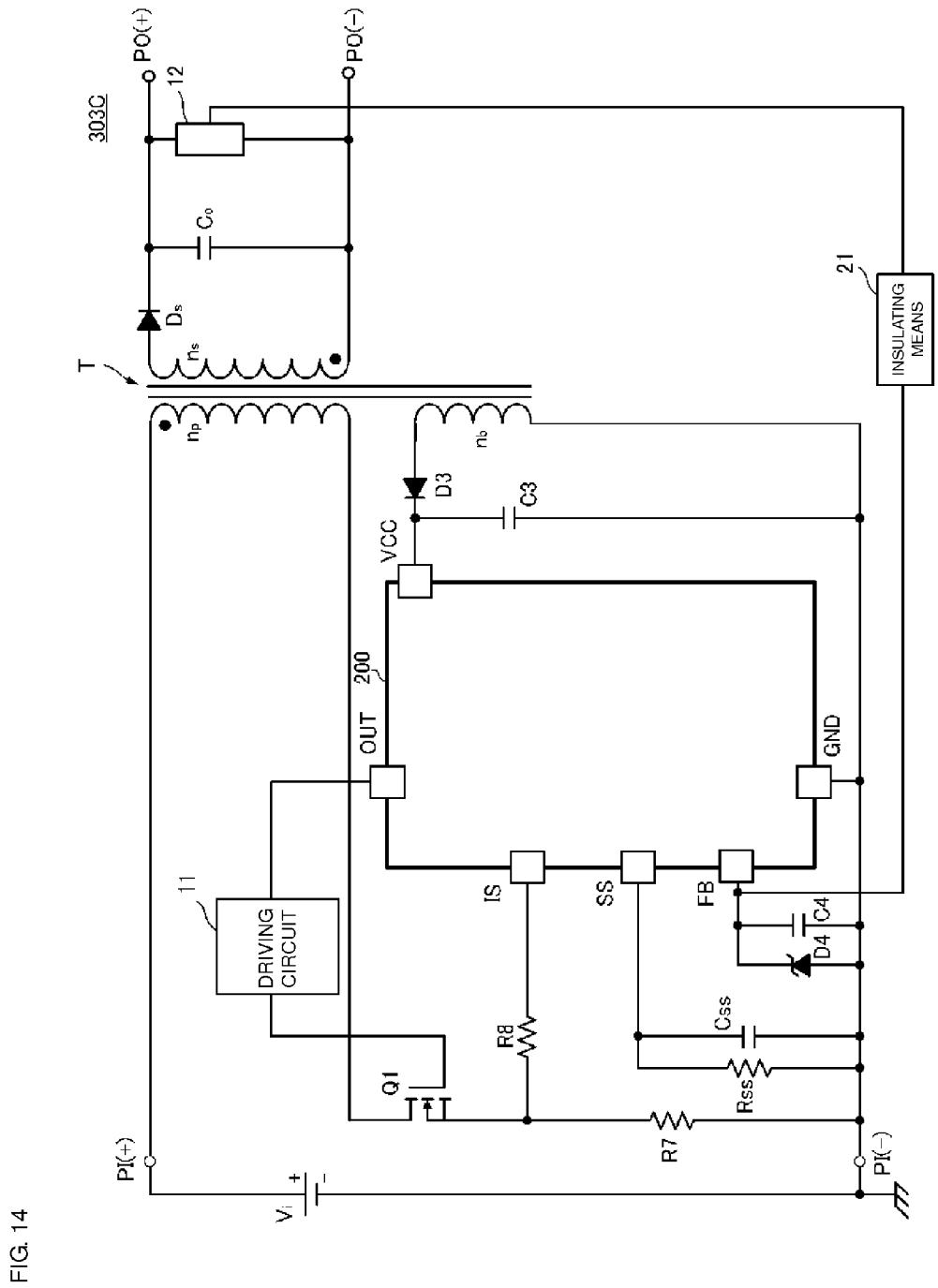
FIG. 14 is a circuit diagram of a switching power supply apparatus 303C according to the third preferred embodiment of the present invention.
Figure 15A:
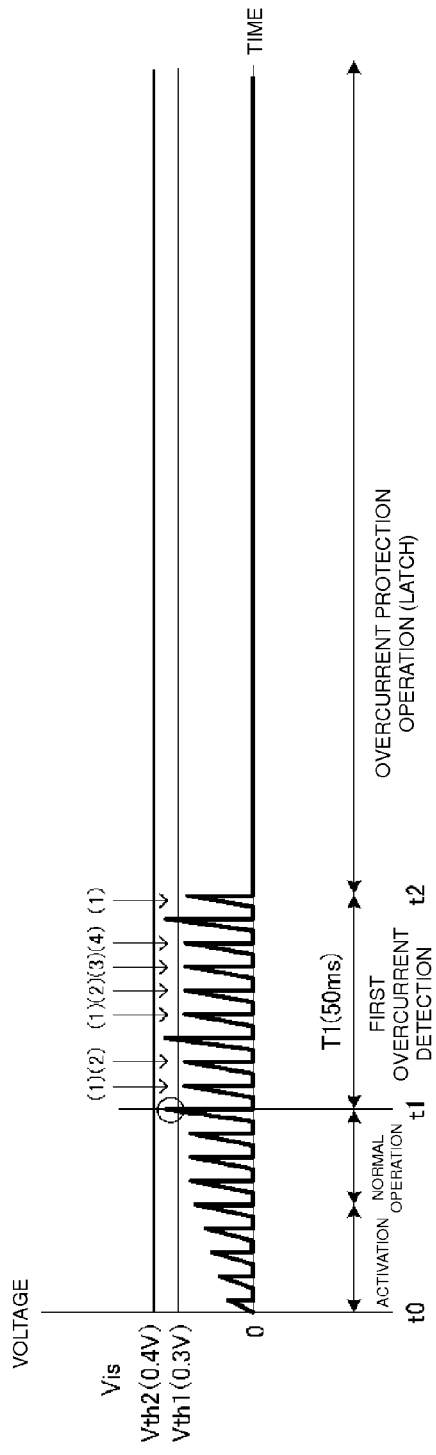
Figure 15B:
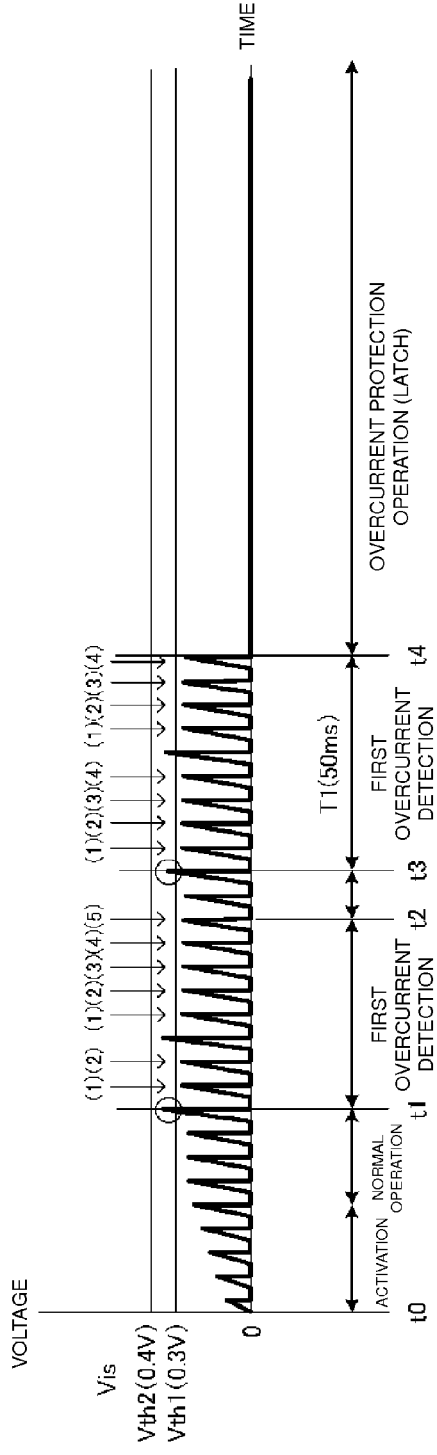
Figure 16:
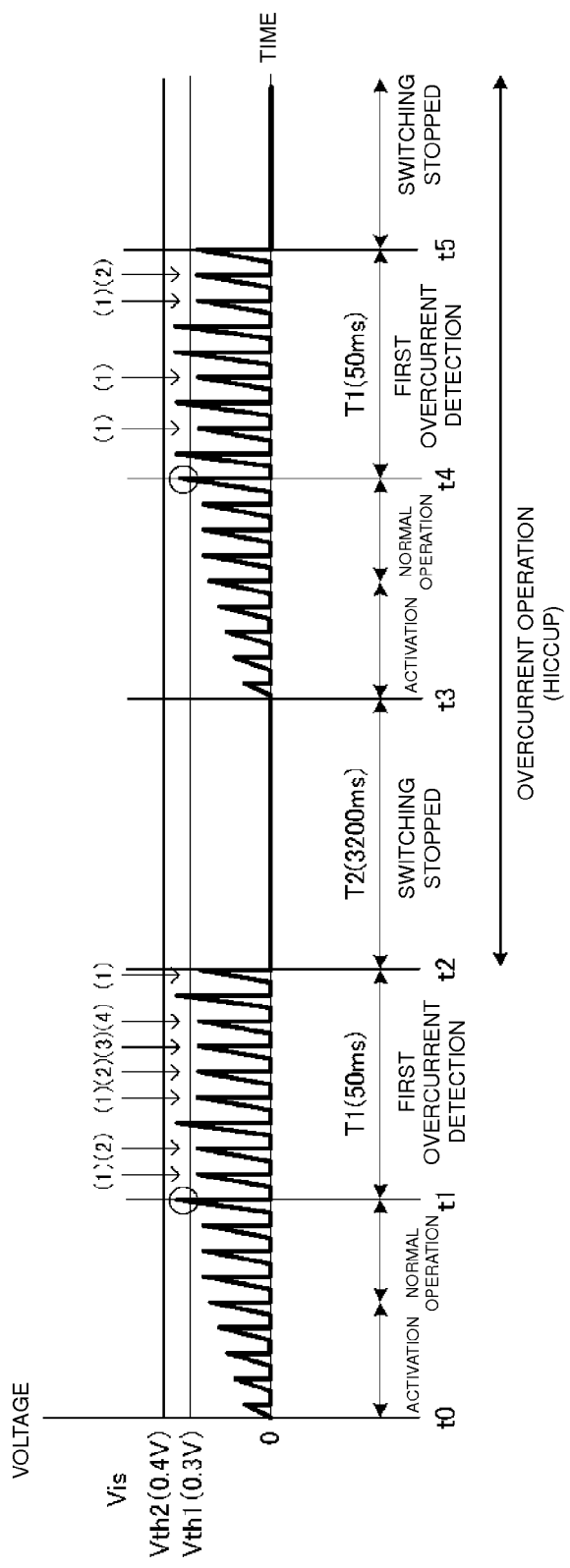
FIG. 16 is a waveform diagram of the voltage Vis of the IS terminal for explaining an overcurrent protection operation in the switching power supply apparatus according to the third preferred embodiment, and is a diagram illustrating an overcurrent protection operation in the self-recovery (hiccup) mode.

FIG. 12, FIG. 13, and FIG. 14 are circuit diagrams of switching power supply apparatuses 303A, 303B, and 303C according to a third preferred embodiment of the present invention. In each of the switching power supply apparatuses 303A, 303B, and 303C, the transformer T preferably is of the flyback type, and a rectifying and smoothing circuit including a diode Ds and a capacitor Co is provided on the secondary side of the transformer T. In this manner, a flyback system preferably is used.

The switching power supply apparatuses 303A and the switching power supply apparatuses 303B differ in terms of a position at which the primary side capacitor Cr is connected. The primary side capacitor Cr need only be inserted in series into a closed loop defined during the on time of the high-side switch device Q2 and, hence, the capacitor Cr preferably is connected in series with the drain of the switch device Q2, as illustrated in FIG. 13.

The switching power supply apparatuses 303C preferably is a simple flyback converter without the inductor Lr, the capacitor Cr, and the switch device Q2. In this manner, a preferred embodiment of the present invention is similarly applied to a simple flyback converter, and similar operations and effects are obtained.

FIGS. 15A and 15B, FIG. 16, and FIGS. 17A and 17B are waveform diagrams in the switching power supply apparatuses 303A, 303B, and 303C according to the third preferred embodiment. These waveform diagrams respectively correspond to the examples illustrated in FIGS. 3A and 3B, FIG. 4, and FIGS. 5A and 5B in the first preferred embodiment. When the switch device Q1 is turned on, a drain current id1 flows. Although the drain current id1 preferably has a waveform shaped like a triangular wave, overcurrent protection is performed similarly to the first preferred embodiment.

Other Preferred Embodiments

The converter system of the switching power supply apparatus of the present invention preferably may be a non-insulating-type converter, but is not limited to an insulating-type converter. Further, various preferred embodiments of the present invention may preferably be applied to a full-bridge type, and are not limited to a half-bridge type.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
   a power conversion circuit configured to convert an input voltage input from an input power supply into an output voltage supplied to a load;
   a switch device configured to perform switching for the input voltage;
   a switching control circuit configured to control the switch device; and
   a current detection circuit configured to detect a current that flows through the switch device in each switching period;
   a first overcurrent protection circuit configured to stop a switching operation without outputting an on signal to the switch device in a case where a current detection signal obtained by the current detection circuit has exceeded a first threshold, and thereafter, when it is determined by the switching control circuit that a number of consecutive switching operations, for which the first threshold is not exceeded, has not reached a predetermined number in a predetermined period.

2. The switching power supply apparatus according to claim 1, wherein the switching power supply apparatus is configured to, after the switching operation has been stopped by the first overcurrent protection circuit, maintain a state in which the switching operation has been stopped.

3. The switching power supply apparatus according to claim 1, further comprising a recovery circuit configured to start the switching a predetermined period after the switching operation has been stopped by the first overcurrent protection circuit.

4. The switching power supply apparatus according to claim 3, further comprising a soft-start control unit configured or programmed to gradually increase an on-time width of the switch device at a time of starting the switching operation.

5. The switching power supply apparatus according to claim 1, further comprising a second overcurrent protection circuit configured to stop the switching operation by making the switch device be in an off state when it has been detected that the current detection signal obtained by the current detection circuit has exceeded a second threshold that is larger than the first threshold.

6. The switching power supply apparatus according to claim 1, wherein the power conversion circuit includes a current resonant converter.

7. The switching power supply apparatus according to claim 1, wherein the switching control circuit includes a switching control IC.

8. The switching power supply apparatus according to claim 1, further comprising a first series circuit including a resonant capacitor, a resonant inductor, a primary winding of a transformer, the switch device, and a current detection resistor.

9. The switching power supply apparatus according to claim 8, wherein the switch device includes an n-type MOSFET including a drain terminal connected to the primary winding and a source terminal connected to the current detection resistor.

10. The switching power supply apparatus according to claim 1, further comprising a second switch device defined by an n-type MOSFET connected to the switch device.

11. The switching power supply apparatus according to claim 1, further comprising a center-tap full-wave rectifying and smoothing circuit including diodes and a capacitor provided at secondary windings of a transformer.

12. The switching power supply apparatus according to claim 1, further comprising a transformer and a rectifying and smoothing circuit connected to the transformer.

13. The switching power supply apparatus according to claim 1, further comprising a second switch element and a driving circuit configured to receive a signal from the switching control circuit and drive the switch device and the second switch element in a complementary manner.

14. The switching power supply apparatus according to claim 1, further comprising a feedback circuit connected to the switching control circuit.

15. The switching power supply apparatus according to claim 1, further comprising a transformer including a secondary side that is a forward type, and a rectifying and smoothing circuit on the secondary side of the transformer.

16. The switching power supply apparatus according to claim 15, wherein the rectifying and smoothing circuit includes diodes, an inductor and a capacitor.

17. The switching power supply apparatus according to claim 15, further comprising a capacitor provided on a primary side of the transformer.

18. The switching power supply apparatus according to claim 1, further comprising a flyback transformer including a secondary side, and a rectifying and smoothing circuit on the secondary side of the flyback transformer.

19. The switching power supply apparatus according to claim 18, wherein the rectifying and smoothing circuit includes a diode and a capacitor.

20. The switching power supply apparatus according to claim 18, further comprising a capacitor provided on a primary side of the flyback transformer.

* * * * *